Sept. 10, 1929.  E. F. MAAS  1,728,163

CUTTING MACHINE

Filed Jan. 25, 1927  8 Sheets-Sheet 3

Inventor
Elov F. Maas,

Attorney

Sept. 10, 1929.  E. F. MAAS  1,728,163
CUTTING MACHINE
Filed Jan. 25, 1927   8 Sheets-Sheet 5

Inventor
Elov F. Maas,

Attorney

Patented Sept. 10, 1929.

1,728,163

UNITED STATES PATENT OFFICE.

ELOV F. MAAS, OF AKRON, OHIO. ASSIGNOR TO THE GOODYEAR TIRE & RUBBER COMPANY, OF AKRON, OHIO, A CORPORATION OF OHIO.

CUTTING MACHINE.

Application filed January 25, 1927. Serial No. 163,379.

My invention relates to machines for cutting sheets of fabric into strips, and it has particular relation to a machine of the above designated character, which is adapted to cut strips of predetermined widths on a bias, that is, at an angle to the general direction of warp threads or cords of the fabric.

In many arts and particularly that of manufacturing pneumatic tires, considerable fabric is utilized which is cut on a bias. It is important that the cutting operation be accurate, inasmuch as excess fabric resulting from any variation in the strip beyond the required minimum width is practically wasted. The importance of providing accurately cut widths is accentuated when the material being cut has previously been treated with various expensive compositions, such as rubber compound or other plastic materials.

The principal object of my invention is to provide a machine which is capable of cutting strips of fabric of uniform width.

Another object of the invention resides in providing a novel cutting mechanism whereby the knife utilized is so designed that it will retain a sharp edge for a relatively long period of time, thus obviating frequent replacements of knife blades.

According to my invention, I have provided a machine which supplies fabric intermittently along a horizontal plane to a cutting mechanism, the supplying mechanism being quiescent during the cutting operation. During the intervals when the supply or feeding mechanism is quiescent a clamping bar engages the fabric securely, and immediately a knife secured to a driven chain cuts the clamped fabric at an angle that may be varied according to the requirements for particular kinds of bias cut material.

For a better understanding of the principles of my invention, reference may now be had to the accompanying drawings forming a part of this specification, of which.

In practising my invention, I provide a bed plate or base 21, which rigidly supports a plurality of vertical or upright frame members 22 that are adapted to support various structural elements and to maintain them in operative relation. A horizontal plate 23 is disposed diagonally of the base 21 and is secured to the vertical members 22 upon which is mounted one of the major portions of my machine consisting of a clamping bar and cutting mechanism indicated generally by the numeral 24.

Figure 1:
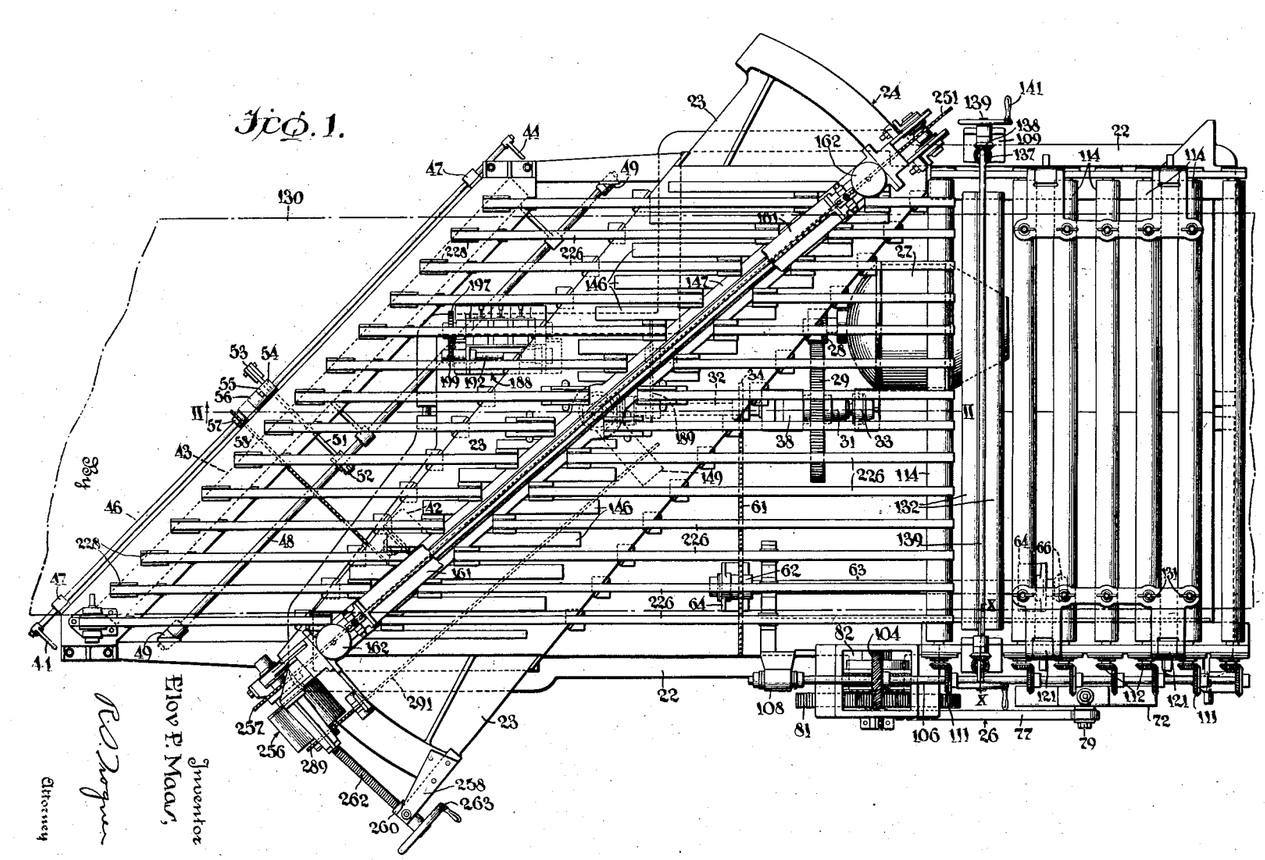
Fig. 1 is a plan view of a bias cutter, embodying one form which my invention may assume.

An intermittently operated fabric feeding mechanism 26, which constitutes the other major portion of the machine, includes a motor 27 that is secured to the base plate 21. The motor is provided with a pinion 28 which drives a gear 29 having a sleeve portion 31 formed integrally therewith. The gear 29 is adapted to rotate freely about a shaft 32, which is journaled in brackets 33 that are bolted to the plate 21. In addition to the gear 29, two sprockets 34 and 36, and a beveled gear 37 are keyed to the shaft 32. A friction clutch member 38 is mounted upon the shaft, adjacent the sleeve portion 31 of the gear 29, and is adapted to transmit power from the gear to the shaft. The clutch is actuated by a piston rod 39 which is linked thereto and which is slidably disposed within a cylinder 41 that is secured to the bed plate. Air is admitted to either end of the cylinder and exhausted from the other end simultaneously through a four-way valve 42 (see Fig. 1) that is interconnected therewith by means of conventional conduits (not shown).

Power from the motor 27 is supplied to the machine through the clutch mechanism 38. Accordingly, when the clutch is released, the operation of the entire machine is arrested. The clutch which is operated by the four way valve 42 may be released by actuating either a pedal 43 which is disposed parallel to the discharge end of the machine, or by turning either of two handles 44. The handles 44 are keyed to the opposite ends of a rod 46 that is rotatably mounted in two brackets 47 bolted to the vertical frame members 22. The pedal 43 rotates a shaft 48 which is journaled at both ends in a suspended bracket 49, that is rigidly secured to the frame 22. The oscillatory movement of the shaft imparted thereto by pushing the pedal downwardly is transmitted to the rod 46 by means of a link 51, both of whose ends are pivotally connected to the free ends of arms 52 and 53. The arm 52 is rigidly secured to the shaft 48, whereas the arm 53 is pivotally mounted on the rod 46. The arm 53 includes an integral collar 54 having a lug 55 which engages a similar lug forming a portion of a collar 56 that is keyed to the shaft 46. The collar is provided with a sprocket wheel 57 rigidly secured thereto, that is connected by means of a chain 58 to the four way valve 42 mentioned above.

When the operator lowers the pedal, the arm 53 which is pivotally mounted upon the shaft is raised. The lug 55 actuates the collar by engaging the complementary lug portion that is integral with the collar member 56 thereby rotating the sprocket 57, which action will in turn actuate the valve through the chain 58. When the pedal 43 is released it will not oscillate the shaft 46 in the reverse direction, as the lugs on the collars 54 and 56 will be moved away from each other. In order that the valve may be actuated in the proper direction to cause the machine to resume operation, it is necessary that the handles 44 which are keyed to the rod be turned in the proper direction.

Figure 6:
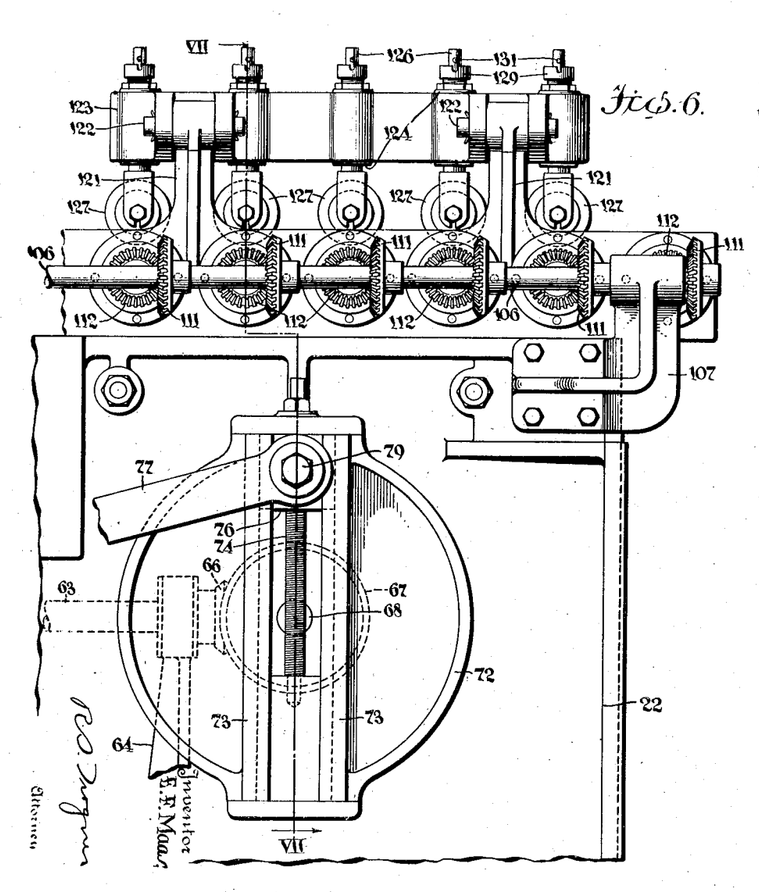
Fig. 6 is a fragmentary side-elevational view on a larger scale of a portion of a fabric supplying or feeding mechanism.
Figure 7:
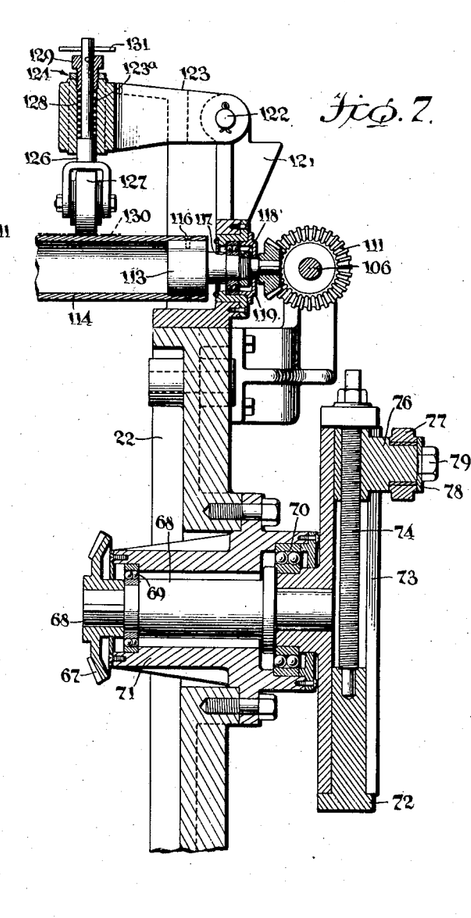
Fig. 7 is a fragmentary cross-sectional view of a portion of the supplying or feeding mechanism taken substantially along the line VII—VII of Fig. 6.

The sprocket 34 which is keyed to the principal or main drive shaft 32 of the machine, is provided with a chain 61 adapted to drive a similar sprocket 62 which is keyed to an auxiliary shaft 63. The auxiliary shaft 63 is rotatably mounted in a set of vertical brackets 64 that are bolted to the bed plate. As best shown in Fig. 6, a beveled gear 66 keyed to the end of the shaft 63 meshes with a complementary beveled gear 67 that is keyed to one end of a stud shaft 68 disposed at right angles to the auxiliary shaft 63. Two roller bearings 69 and 70, are secured in a housing 71 that is bolted securely in the vertical frame member 22 and rotatably supports the stud shaft 68. A crank disc 72 is keyed to the other end of the stud shaft and is provided with a set of parallel diametric guides 73 integral therewith. A threaded shaft 74 which is rotatably mounted between and is parallel to the guides 73 is screwed through a crosshead 76 that is slidably disposed between the guides.

Figure 8:
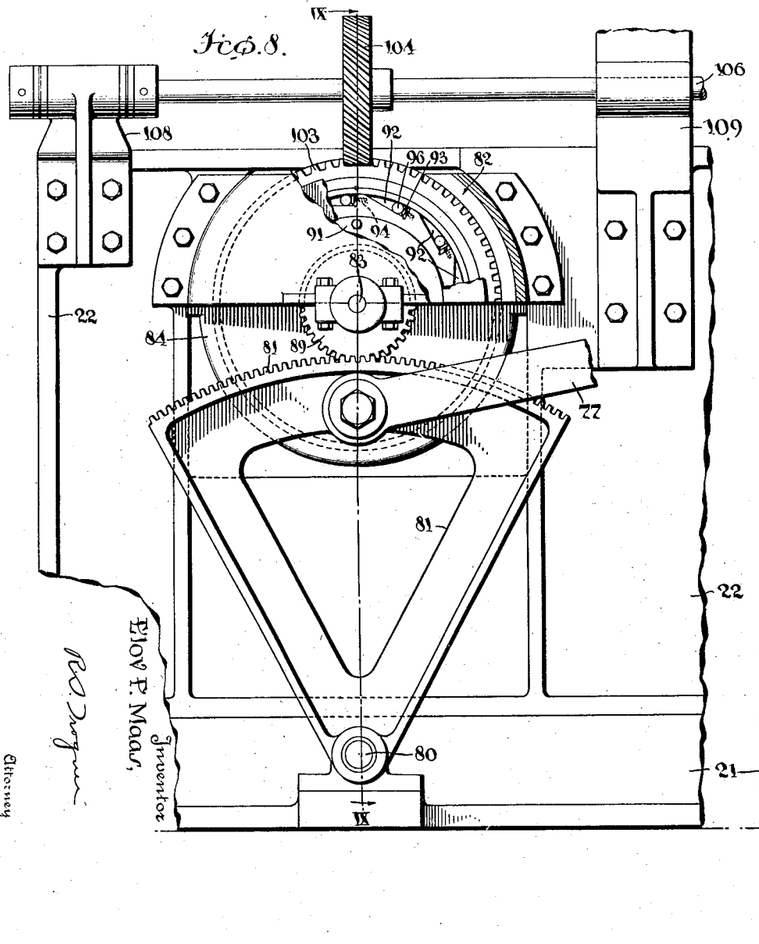
Fig. 8 is a fragmentary side-elevational view of another portion of the feeding mechanism which cooperates with that illustrated in Fig. 6 to supply fabric to the cutting mechanism intermittently.
Figure 9:
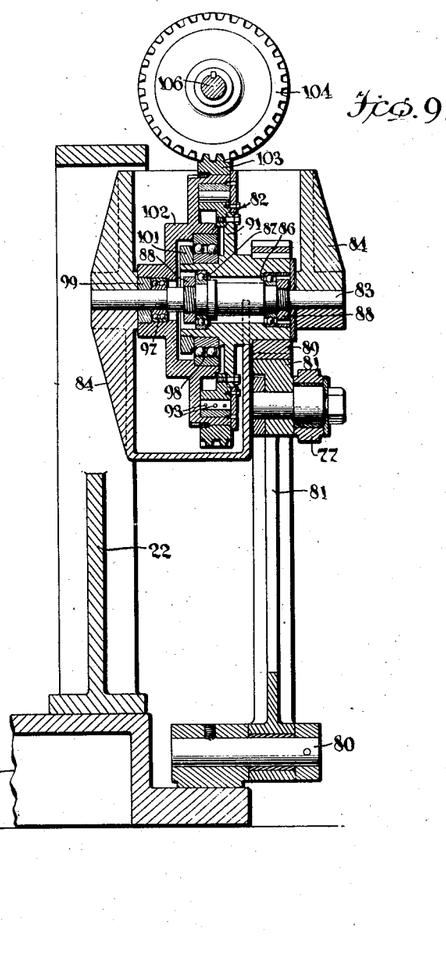
Fig. 9 is a fragmentary cross-sectional view of the mechanism illustrated in Fig. 8, taken substantially along the line IX—IX thereof.
Figure 10:
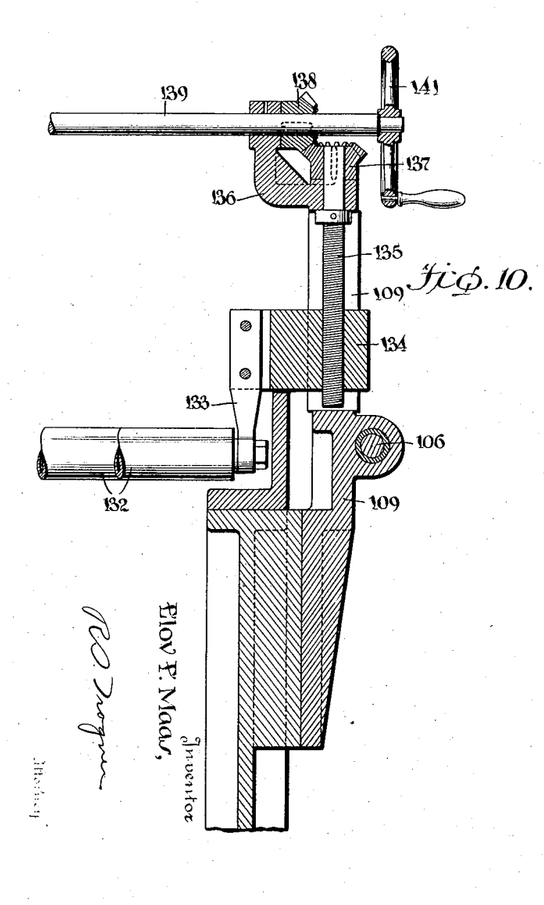
Fig. 10 is a fragmentary cross-sectional view on a larger scale of the fabric engaging rollers illustrated in Fig. 1, and taken substantially along the line X—X thereof.

One end of a pitman rod 77 is rotatably secured to the crosshead and is maintained in operative relation therewith by means of a washer 78 and a bolt 79 that is screwed to the projecting end thereof. The other end of the pitman 77 is similarly secured to a gear segment 81, which is pivoted to the bed plate 21, as indicated at 80. As best illustrated in Figs. 8 and 9, the gear segment is adapted to actuate a one-way or ratchet clutch 82, which includes a shaft 83 mounted in a journal housing 84 that forms a part of the vertical frame member 22. Two complementary ball bearings 86 and 87 are maintained securely against shouldered portions of the shaft 83 by means of nuts 88 that are screwed thereon. A gear 89 which meshes with the oscillating segment 81 is formed integrally with a flanged ratchet disc 91 having a plurality of recesses 92, and is mounted on the complementary ball bearings 86 and 87.

Each of the recesses 92 receives three pins 93 having enlarged ends which are resiliently maintained in position by means of coiled springs 94 that encompass the shank of the pin. These spring-actuated pins yieldably engage cylindrical steel rollers 96 disposed within each of the recesses in the manner illustrated in Fig. 8.

Two additional ball bearings 97 and 98 are provided, the bearing 97 being mounted upon the shaft 83, and maintained in proper position by means of a nut 99. The other bearing 98 is secured to the hub portion of the disc 91 and is maintained in operative position by a large nut 101 which is screwed thereon. A shouldered drum 102 is mounted upon the ball bearings 97 and 98 and is thereby maintained in rotatable relation with respect to the disc 91. The extreme outer portion of the drum 102 encloses the recessed disc in concentric relation and is engaged by the steel rollers 96 which rest within the substantially triangular recesses 92 thus formed.

When the disc 91 is rotated in a clockwise direction, as viewed in Fig. 8, cylindrical members 96 within triangular recesses 102 are wedged against the inner circumferential wall of the drum 102, which is thereby locked with respect to, and rotated with, the disc 91. If, on the other hand, the member 91 is rotated in a counter clockwise direction as viewed in Fig. 8, no such wedging or locking action can occur.

A ring gear 103 is rigidly secured to the outer periphery of the shouldered drum and drives a spiral gear 104. The spiral gear is keyed to a horizontal drive shaft 106 which is rotatably supported in brackets 107 and 108, and in a bifurcated casting 109, all of which are alined and rigidly secured to the vertically disposed frame members 22. Seven bevel gears 111 are keyed to the shaft 106, each of which meshes with a complementary gear 112 that is keyed to one end of a shouldered stud shaft 113. The other end of the stud shaft 113 is enlarged in cross-section, and is held securely in one end of a knurled cylindrical roller 114 by screws 116. A roller bearing 117 is fitted against the shouldered stud shaft 113 and is maintained securely thereagainst by a nut 118 which is screwed upon the shaft. The bearing 117 is secured in the frame 22, and is maintained in position by means of a housing 119 which is bolted to the frame. The other end of each of the cylindrical rollers 114 is similarly journaled in the opposite portion of the frame 22.

Two brackets 121 are formed integrally with the frame 22, each of which is provided with a pin 122 that pivotally supports a bifurcated member 123 having a plurality of reamed openings 123ᵃ therein. A caster 124 disposed within each of the reamed openings, includes a bifurcated shouldered shank 126, a roller 127 rotatably mounted within the bifurcated portion of the shank 126 and whose periphery is adapted to engage the cylindrical rollers 114 and a coiled spring 128 which is disposed about the portion of the shank within the reamed opening 123ᵃ. One end of the spring engages the shouldered portion of the shank, whereas the other end abuts the base of a castellated nut 129 that is screwed within the opening at the top of the bifurcated member. The compressive force of the spring 128 may be varied by screwing the nut 129 inwardly or outwardly. Inasmuch as the weight of the pivoted member 123 which is sustained by the several rollers 127 is transmitted through the springs 128 there is a tendency to distribute or equalize the load among the several rollers. If each roller is set at a slight angle to the axis of the cylindrical roller 114 which it engages, it will tend to draw a sheet of fabric material 130 outwardly in opposite directions, and thereby eliminate any folds or wrinkles therein. A pin 131 is secured in the upper end of the shank 126 and extends transversely therethrough for the purpose of facilitating such adjustment of the caster.

Two cylindrical idler rollers 132 are rotatably mounted at their ends upon arms 133 on opposite sides of the machine that are secured to tapped blocks 134 slidably disposed within the bifurcated portions of the standards 109. Each block is adapted to be actuated vertically by a threaded shaft 135 that is rotatably mounted in an L-shaped journal member 136 which is rigidly secured to the top of the standard 109. A beveled gear 137 is keyed to the upper end of the shaft 135 and meshes with a similar gear 138 that is keyed to a shaft 139. The shaft 139 is rotatably mounted adjacent its ends within the L-shaped journals 136 and is provided with a hand wheel 141 at each end to facilitate rotation thereof. In directing the sheet of fabric 130 through the machine the idler rollers 132 are raised in order that the fabric material may conveniently be passed thereunder. Subsequently, the rollers are lowered by rotating the hand wheel 141 in an appropriate direction until the rollers assume the position illustrated in Fig. 3. The function of this portion of the machine is to insure frictional contact between the knurled feed rollers 114 and the fabric.

A plurality of parallel bars 146 are secured to the diagonally disposed plate 23 which support a revolvable cutter bar 147, T-shaped in cross-section. A flanged bearing sleeve 148 (Fig. 2) is rigidly secured to the base of the bar 147 in co-axial relation with its mid-portion and projects through an opening 147$^a$ in the plate 23. This construction provides for limited rotation of the bar 147 about an axis defined by the sleeve 148. Adjacent the plate 23, an arm 149 is rigidly secured to the projecting portion of the sleeve 148 and includes two suspended journal brackets 151 which are bolted thereto. Since the arm and brackets are rigidly secured to the cutter bar, they are adapted to revolve about the axis thereof as a unit and to carry therewith a shaft 152 which rigidly supports a sprocket 153 and a beveled gear 154. A complementary beveled gear 156 is keyed to a vertically disposed shaft 157 that is rotatably mounted in a bracket 158, the latter being secured to the bed plate 21. The shaft 157 is co-axially disposed with respect to the bearing sleeve 148 of the revolvable cutter bar 147 and is driven by a second beveled gear 159 which meshes with the gear 37. It will be apparent that by reason of the co-axial arrangement of the elements, the bevel gear 154 will at all times mesh with its complementary gear 156, regardless of the angular position of the cutter bar.

Figure 2:
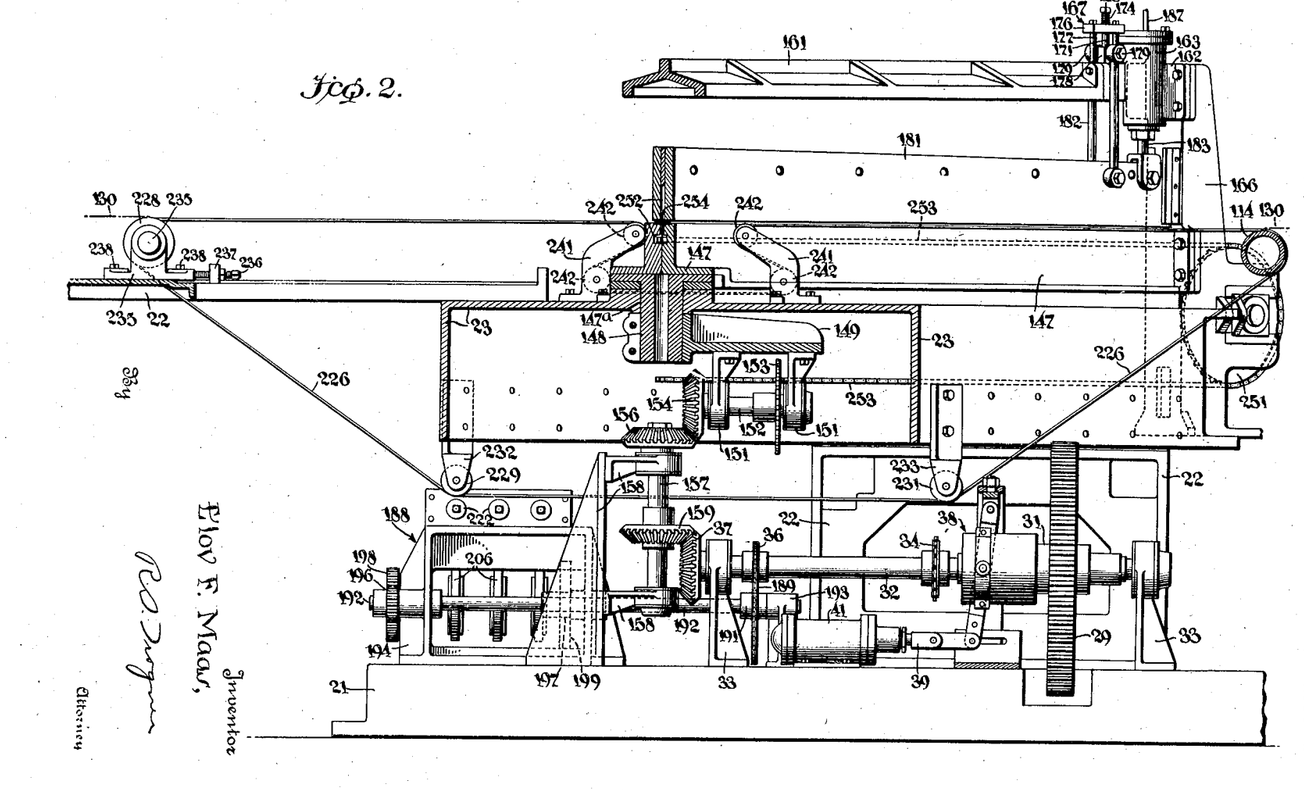
Fig. 2 is a fragmentary cross-sectional view of a portion of the bias cutter taken substantially along the line II—II of Fig. 1.
Figure 18:
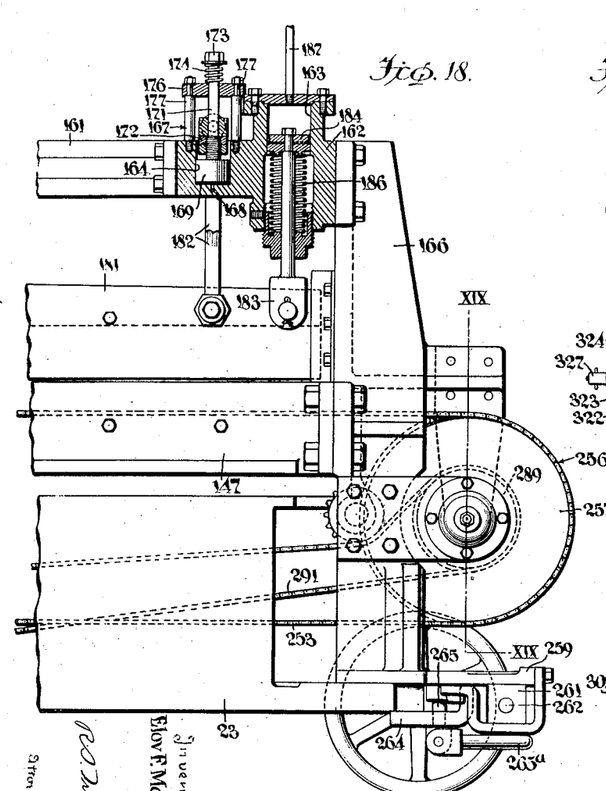
Fig. 18 is an elevational view partially in cross-section, illustrating a portion of the cutter bar mechanism of the bias cutter.

A ribbed cross member 161 extends across the plate 23 and is disposed immediately above and parallel to the cutter bar 147. Each end of the cross member 161 is bolted to a casting 162 provided with two cylindrical chambers 163 and 164 and which is in turn rigidly secured to a vertically disposed standard 166 that is bolted to the ends of the cutter bar 147. One of the cylindrical chambers 164 forms a portion of a dash pot mechanism 167, and is provided with a vent or opening 168. A piston 169 having a vertically extending piston rod 171 secured thereto is slidably disposed in the cylinder 164. Two nuts 172 and 173 are secured to the rod, the nut 172 being disposed near the mid portion of the piston rod and being adjustable axially thereon, whereas nut 173 is screwed to the upper extremity of the rod. In order to raise the piston after it has been actuated downwardly, a coil spring 174 is provided which surrounds the upper end of the rod 171. One end of the spring engages the nut 173, and the other end rests upon a cross member 176 which is secured to a pair of vertical shouldered pins 177 that are screwed in the casting 162. As best shown in Figs. 2 and 18 a collar 178 having two oppositely disposed integral lug portions 179 is slidable along the rod 171, and is adapted to engage the nut 172 which is adjustably secured to the rod. Both of the lug portions are connected to a vertically movable fabric-clamping bar 181 by means of individual links 182 that are pivotally secured at their ends, to the lugs and clamping bar respectively. The clamping bar, which is disposed parallel to the cutter bar 147, is provided with a longitudinally slotted base for reasons to be described hereinafter, and is actuated vertically by two bifurcated piston rods 183 each of which is connected to an individual piston 184 that is disposed in the cylindrical chamber 163. The piston is urged upwardly at all times by a coil spring 186, one end of which rests on the base of the cylindrical chamber 163 and the other end of which engages the piston 184. Fluid under pressure is admitted to the head of the cylinder and exhausted therefrom through a pipe 187 which maintains fluid communication with a valve mechanism 188 that operates in synchronism with the intermitently operated fabric feeding device 26.

When the fluid enters the head of the cylinder 163, it forces the piston downwardly thereby lowering the bar 181 and at the same time compressing the spring 186. Before the bar engages the fabric 130 which rests upon the cutter bar 147, the collar 178 which is actuated by the clamping bar through the links 182, engages the nut 172 which is adjustably secured to the rod 171. Accordingly, further downward movement of the bar will cause the piston forming a part of the dash pot to be lowered. Inasmuch as the fluid within the dash pot chamber cannot escape rapidly, a pressure is built up within the chamber which results in cushioning the downward movement of the clamping bar. As soon as the pressure within the cylinder is equalized with that of the atmosphere, that is, after the compressed fluid has had time to escape through the vent 168, the bar will engage the fabric and clamp it securely. This requires only a very short interval of time. After the fabric so secured by the clamping bar has been cut in a manner hereinafter described, the fluid is exhausted from the cylindrical chamber 163. The spring 186 will thereafter raise the piston 184 together with the clamping bar; and at the same time the collar 178 which is loosely disposed about the rod 171 is likewise carried upwardly, thereby releasing the spring 174, which will raise the dash pot piston 169 preparatory for another cutting cycle.

Air is admitted and exhausted from the clamping bar cylinders 163 at the proper intervals by means of the cam operated valve mechanism 188 illustrated in Figs. 2 and 13 to 17, inclusive. Referring to Fig. 2, it will be observed that the sprocket 36 drives a chain 189 which is trained over a sprocket 191, the latter being keyed to a shaft 192. One end of this shaft is rotatably mounted in a bracket 193 which is secured to the bed plate 21 and the other end of the shaft is journaled in a frame portion 194 of the valve mechanism, the latter likewise being secured to the plate 21. Two pinions 196 and 197, the one having a greater number of teeth than the other, are keyed to the shaft 192 and mesh with two gears 198 and 199, respectively, which are mounted upon a secondary shaft 201 that is parallel to the former and rotatably mounted in the frame of the valve mechanism 188. The gear 198 is keyed to the shaft 201, whereas the other gear 199 is freely mounted thereon and includes an extended sleeve portion 202 which is integral with a cam 203 likewise freely mounted upon the shaft 201. Two other cams, 204 and 205, similar to cam 203, are keyed to the shaft 201 and are accordingly adapted to be rotated by the gear 198. In order to facilitate the timing of the cam mechanisms, the cams are constructed to include rings 206 such as those illustrated in Figs. 15, 16 and 17, the peripheral portions of which are machined to provide raised valve operating surfaces 206$^a$, 206$^b$ and 206$^c$, whereas the inner circumferential portions are serrated, as indicated at 206$^d$, and mesh with similarly serrated discs 207, that are keyed to the shaft 201. The rings 206 and discs 207 are maintained in alignment by flanged collars 208 disposed on both sides thereof and bolted together in the manner illustrated in Fig. 13.

One end of a lever 209 which is pivoted about a stud shaft 211 mounted in the frame of the valve mechanism, engages the surface of the cam and is actuated thereby. The other end of the lever 209 has a valve stem 212 secured thereto, which extends through a chambered block 213. A valve head 214 is rigidly secured to the stem 212 within the block 213, the latter being unitary with the frame 194 and having two interconnected chambers 216 and 217 provided with openings 218 and 219 respectively. Fluid under pressure is admitted to the chamber 216 through the opening 218 and flows past a valve seat 221 and thence to the other chamber 217 from which it is exhausted through the opening 219. A spring 220 is coiled about the stem 212 and urges the valve head 214 into engagement with the valve seat 221. Access to the internal mechanism of the valve may be had by removing a plug 222 which is screwed into one end of the chambered block. When it is desired that the valve be opened, the lower end of the lever 209 is actuated in a counter-clockwise direction, as viewed in Fig. 14, whereby communication between the two chambers 216 and 217 is established. The valve is automatically closed by the coil spring 220 which engages the valve head 214, when the lever 209 is released.

It will be observed that three such valve mechanisms have been provided. The intermediate valve member operated by the cam 204 is adapted to exhaust the pressure fluid which acts upon the head of the piston 184 whereby the clamping bar 181 is raised. The valve on the right hand side, as viewed in Fig. 13, operated by the cam 205 is adapted to admit fluid to the head of the piston 184.

Figures 13, 14, 15, 16, 17:
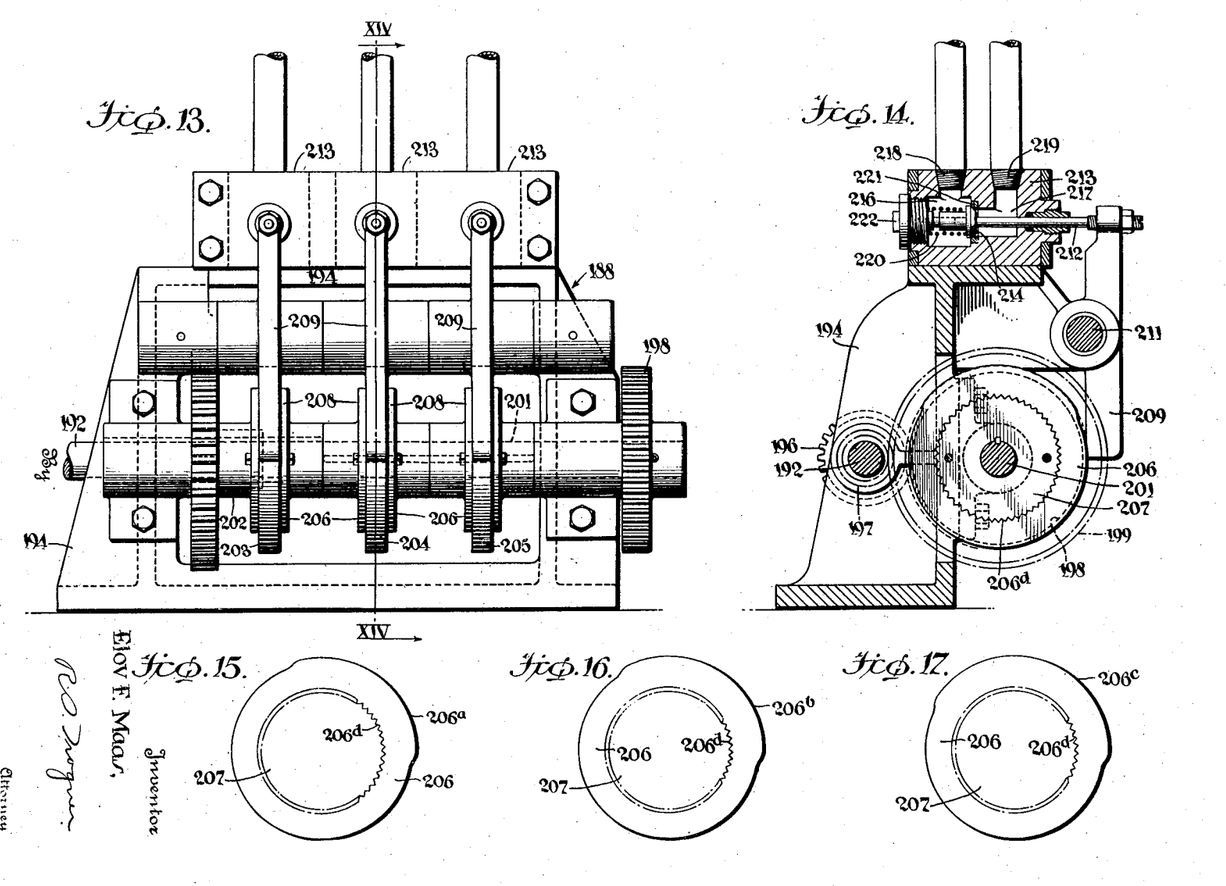
Fig. 13 is a side-elevational view of the valve mechanism which controls the operation of the clamping bar of the bias cutter.
Fig. 14 is a cross-sectional view of the structure illustrated in Fig. 13, taken substantially along the line XIV—XIV thereof.
Figs. 15, 16 and 17 are profile views of cam members which constitute a part of and control the operation of the valve mechanism shown by Fig. 13.

When it is desired that the clamping bar be lowered only after two or more forward strokes of the feeding mechanism 26, the valve on the left operated by the cam 203 is employed in lieu of that shown on the right hand side of Fig. 13. The gear ratio of the valve mechanism may be changed to open the valve during any desired periodic interval. When the valve embodying the cam 203 is employed, fluid communication with the valve embodying the cam 205 will of course be shut off by means of a suitable gate valve (not shown). Obviously, no change in the operation of the exhaust valve is necessary, inasmuch as communication therethrough may be maintained as long as the cutter bar 147 is in a raised position, without affecting its movement.

For the purpose of conveying the fabric 130 from the intermittently operated feed rollers 114 through the cutting mechanism, a plurality of belts 226 are provided which are trained and driven by one of the feed rollers 114 adjacent the cutter bar 147. These belts transport the fabric from the feed rollers to the cutter bar, the belts thereafter being guided beneath the cutter bar by means of a by-pass pulley mechanism 227 (see Figs. 4 and 5). The strips cut by the cutting mechanism in a manner hereinafter described are then conveyed from the discharge end of the cutter bar away from the machine by the belts 226 which emerge from beneath the bar and extend in a horizontal plane therefrom. Each belt returns to the nearest of the feed rollers 114 by way of an adjustable pulley 228, and two idler pulleys 229 and 231 that are respectively rotatably mounted in brackets 232 and 233 secured to the diagonal plate 23. The adjustable pulley is rotatably mounted in a linearly adjustable bracket 235 which is slidable in a direction parallel to the path of travel of the fabric. This bracket is actuated by a set-screw 236 disposed in a lug 237 that is integral with the frame member 22 and is bolted thereto, as indicated at 238. By adjusting the bracket 235, the conveyor belt is maintained under any desired tension.

It will be observed that when the cutter bar is adjusted to assume different angular positions with respect to the fabric, the by-pass mechanism 227 must be shifted together with the bar 147 a distance equivalent to the longitudinal component of the angular change. Near the axis of revolution, the linear change is relatively insignificant. On the other hand, the position of the ends of the bar 147 is adapted to be varied considerably.

Figure 4:
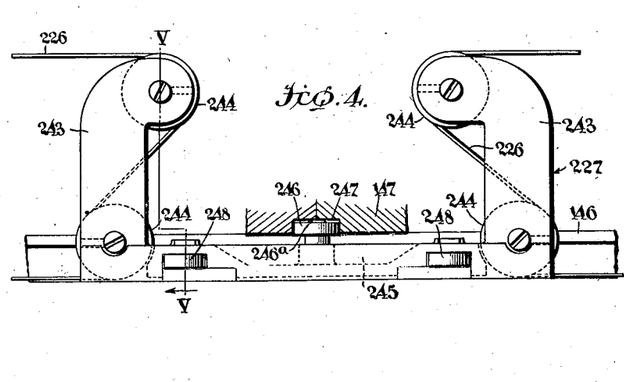
Fig. 4 is a side-elevational view on a larger scale of a pulley mechanism for conducting conveyor belts about an adjustable cutter bar embodying a portion of the invention.
Figure 5:
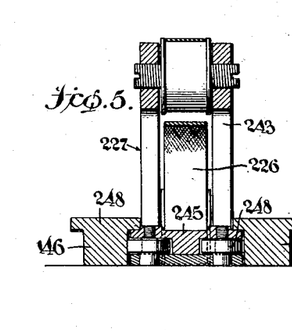
Fig. 5 is a cross-sectional view of the pulley mechanism taken substantially along the line V—V of Fig. 4.

Two symmetrical bracket members 241 are provided adjacent the center of the device, which are bolted to the plate 23 between adjacent cross bars 146. Two pulleys 242 (Fig. 2) are rotatably mounted in each of the brackets 241, which assist in conveying the belts beneath the cutter bar at its central portion. In order to compensate for the variation in the position of the end portions of the bar 147, the automatic by-pass mechanism 227, illustrated in Figs. 4 and 5, is provided. This mechanism includes a set of symmetrical brackets 243 having pulleys 244 similar to the brackets 241 and pulleys 242 above referred to, except that each has a common movable base portion 245. A small wheel 246 is rotatably mounted upon a short vertical stud shaft 246ª which is unitary with the base 245, this wheel being adapted to engage a recess 247 in the base of the revolvable cutter bar 147. Four auxiliary wheels 248 are likewise rotatably mounted in the base 245 and are disposed at opposite sides thereof, where they are in rolling contact with the parallel bars 146. It will be apparent that when the cutter bar is shifted about its central axis, it will actuate the brackets 243 by reason of their engagement with the roller 246. It will likewise be apparent that the direction in which the bracket may be actuated will be governed by the parallel bars 146. Since the length of the path which the belt must travel remains constant, no linear adjustment thereof is necessary when the angular position of the cutter bar is changed.

Figure 11:
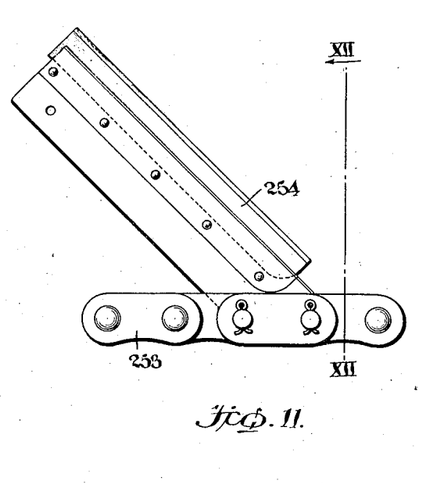
Fig. 11 is a side-elevational view of the knife blade and illustrates the manner in which it is secured to the chain by which it is actuated.
Figure 12:
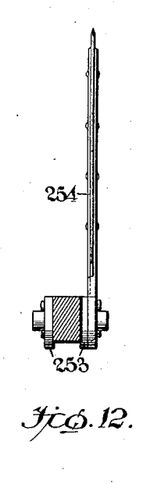
Fig. 12 is a cross-sectional view of the chain and an edge elevational view of the knife illustrated in Fig. 11.

Near the mid-portion of the standard 166 (see Fig. 2), an idler sprocket wheel 251 rotatably mounted therein is aligned with a longitudinal slot 252 provided in the cutter bar 147 and in the clamping bar 181 jointly. A driven chain 253 bearing a knife 254 (Fig. 11) is disposed within the slot 252. The chain is driven from the other end of the cutter bar by a drive mechanism 256, including a sprocket 257, hereinafter to be described.

The chain is of ordinary construction, including a plurality of links and rollers, and supports the knife 254 in a position oblique to the path of travel of the chain. The upper peripheries of the idler sprocket 251 and the drive sprocket 257 about which the cutter chain is trained are disposed in a position whereby the chain which travels therebetween is disposed at a slight angle to the horizontal plane of the fabric at the cutter bar. Accordingly, the fabric is initially cut by that part of the knife blade adjacent the chain link to which it is directly attached, whereas the latter portion of the cutting operation is affected by the outer end portion of the knife. Inasmuch as this construction permits the use of a knife having a relatively long cutting edge, its sharpness and life is prolonged.

Angular adjustment of the cutting bar 147 is effected by means of a mechanism that includes two arms 258 and 259, which respectively support swiveled blocks 260 and 261. The block 261 is provided with a tapped opening, wherein a threaded shaft 262 is mounted. One arm 258 is bolted to the diagonally disposed plate 23 whereas the other arm 259 is secured to the base of the standard 166. The shaft 262 is provided with a hand wheel 263 to facilitate its rotation. By turning the shaft, it will be apparent that the swiveled block 261 will urge the clamping bar in a direction dependent upon the direction of rotation of the shaft.

The bar is positively secured in adjusted position by means of a clamping device (see Fig. 18) which includes an L-shaped member 264, one end of which engages the edge of the diagonal plate 23 and the other end of which engages the arm 259. A shouldered bolt 265 embodying a pivotable handle 265ª passes through the L-shaped member, and is screwed into a tapped opening provided therefor in the arm 259. By rotating the bolt 265 in the proper direction, the edge of the diagonal bar 23 will be clamped between the L-shaped member and the extended portion of the arm 259. Conversely, when the bolt is rotated in the reverse direction, the mechanism will be unclamped, thereby permitting adjustment of the bar 147.

When it is desired that the fabric 130 be clamped and cut after each feed stroke or each forward movement of the pitman 77, the valve mechanisms operated by cams 204 and 205, illustrated in Fig. 13, are employed. Under these circumstances the chain 253 which carries the knife 254 is rotated continuously. When, however, it is desired to cut relatively wide strips of fabric, a more uniform product is obtained if the feeding mechanism 26 is operated through two relatively short feed strokes rather than one long one. For this purpose, the mechanism 256 is provided for controlling the operation of the cutter chain which cooperates with the valve mechanisms 203 and 204, illustrated in Fig. 13, for actuating the cutter bar mechanism.

One end of the drive mechanism 256 is journaled in an L-shaped bracket arm 267 that is bolted to the standard 166, and the other end of the mechanism is journaled in the standard 166. The mechanism includes a worm segment 271 keyed to a shaft 272 which is provided with two sleeves 273 and 274 having a plurality of shouldered portions, these sleeves being maintained in relative rotatable relation with respect to the shaft. A link 276 having an irregular aperture which is non-rotatably secured to the end of the shaft 272, is maintained in position by a nut 277 screwed to the end thereof. The free end of the link 276 is provided with an opening for receiving a set screw 278 that is adapted to fit a tapped opening 278ª in the L-shaped arm 267. By reason of the arrangement of the elements, hereinafter described in detail, that comprise this variable drive mechanism, the variable effect is realized only when the shaft 272 is secured against rotation by the link 276 and set screw 278. When the set screw 278 is withdrawn the shaft is permitted to idle and the variable mechanism is inoperative, the cutting operation being performed each time the supply mechanism moves the fabric forwardly by a stroke of the pitman 77. The ability of the shaft 272 to rotate depends solely upon whether or not the set screw 278 in the end of the link is positioned in the tapped opening 278ª provided therefor.

Figure 3:
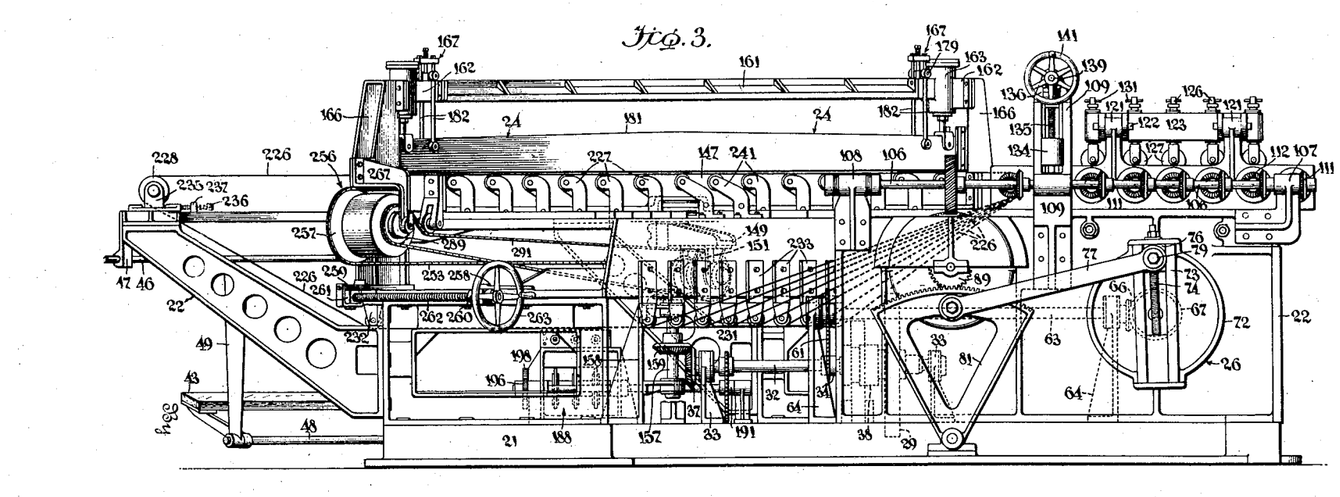
Fig. 3 is a side-elevational view of the structure illustrated in Fig. 1.

A shouldered sleeve 279 rotatably mounted upon the sleeve 273 is provided with an annular recessed portion 280, which receives a roller bearing 281, the latter being secured about the shaft 272. A collar 283 serves as a spacer between the bearing 281 and a similar bearing 282 that is likewise secured about the shaft. A third roller bearing 284 abuts the shouldered portion of the sleeve 279 and coacts with the bearing 282 to maintain a journal bearing element 286 in rotative relation with respect to the sleeve 279 and the shaft 272. The journal bearing member 286 is of irregular shape, and includes as an integral unit a disc portion 287 having a recessed periphery adapted to receive a suitable packing 288 and also rigidly to support a sprocket 289 that is driven by a chain 291 from the sprocket 153, as illustrated in Fig. 3. Also the journal member 286 includes a counterweight 292 for offsetting the unbalanced load caused by the unsymmetrical construction of the entire revolvable journal member.

A worm gear 293 meshes with the worm segment 271 and is keyed to an auxiliary shaft 294 that is rotatably mounted in the journal member. As the worm gear 293 is revolved about the shaft 272, it is caused to rotate by reason of its meshing engagement with the worm 271 while the latter is stationary. At one end of the auxiliary shaft 294 a gear 296 is provided which is keyed thereto and which meshes with a gear 297 of equal size, that is keyed to a second auxiliary shaft 298 likewise rotatably mounted in the journal member 286. Adjacent the gear 297 a cam disc 299 keyed to the shaft 298 is provided with a cam channel 301 machined therein. The ratio between the worm gears 271 and 293 is such that bodily rotation of the journal bearing member 286 with respect to the individual rotation of the shaft 294 and gear 296 is, 8 to 1. That is, the journal member 286, together with the gears 293, 296 and 297, rotates eight times about the axis of the shaft 272 while the shafts 294 and 298 are rotated one revolution about their respective individual axes. It is to be understood that the pitch of the worm gear elements may be varied to change the ratio indicated, which is merely illustrative of one application of the invention.

A rectangular bar 302 having a groove 302ª therein is mounted in the journal bearing 286 and is slidable in a direction parallel to the axis of the shaft 272. A plate 303 is screwed to the base of the bar 302 and is provided with two coiled springs 304 which extend within the grooved portion thereof. A latch 306 having two reamed openings 300 in one end thereof adapted to receive the end portions of the springs 304 is slidably disposed within the grooved portion 302ª of the bar. In order to provide for transverse movement of the latch 306 and the bar 302 with respect to the shaft 298, the latch 306 and the bar are slotted near their mid-portions, as indicated at 306ª, to receive the shaft 298 which passes therethrough. The latch 306 is also provided with a second slot 305 near its outer extremity. A pin 307 securely fastened to the bar 302 extends through the slot 305 of the latch 306, into the channel 301 of the rotatable cam disc 299 and is actuated thereby. Linear movement which is imparted to the pin 307 by reason of the irregular contour of the cam channel will be transmitted directly to the bar 302 and latch 306.

The latch extends a short distance beyond the end of the bar and is adapted to engage a lug 309 which is integral with a disc wheel 311, that is keyed to the sleeve 274. A cylindrical member 312 is rigidly secured to the periphery of the disc wheel 311 by screws 314 and is adapted to engage the packing 288 that is provided in the recessed portions of the revolvable journal member 286. An oil seal is thereby established whereby the mechanical elements contained within the cylinder may at all times be immersed in a suitable lubricating fluid.

The sprocket wheel 257 is rigidly secured to the sleeve 274 by means of a set screw 316 and is adapted to drive the cutter chain 253. Two ball bearings 317 and 318 are provided, which surround portions of the sleeve 274 and are maintained in spaced relation with respect to the sprocket 257 by means of rings 319. The bearings are contained in circular openings provided therefor in the standard 166. The bearing 318 is maintained in position by a nut 321 screwed upon the end of the sleeve 274. At the end of the shaft 272 a roller bearing 322 is provided which is maintained in operative position by means of a nut 323. An oil cap 324 surrounds the end of the shaft and engages the outer race of the bearing 322. The cap is rigidly secured to the standard 166 by bolts 326 which pass therethrough. At various locations about the mechanism 256, plugs 327 having valves therein are provided to facilitate the lubrication of the relatively movable parts.

In operating this portion of the device, the link 276 is secured in a stationary position by the set screw 278, whereby rotation of the shaft 272 bearing the worm segment 271 is prevented. The sprocket 289 which is adapted to be rotated continuously by the chain 291 revolves the journal member 286 about the shaft 272. This rotary movement of the journal member causes the worm gear 293, which meshes with the worm segment 271 to be rotated about the axis of the shaft 294, and which in turn rotates the shaft 298 through the intermeshed gears 296 and 297. The cam disc 299 which is keyed to this shaft will likewise be rotated and will, in turn, actuate the pin 307. When the latch 306 is actuated outwardly to assume the position illustrated in Fig. 21, it will engage the lug 309 on the disc 311 and will rotate the latter. Likewise the sleeve 274, which will thereby be rotated, will drive the sprocket 257 over which the knife supporting chain 253 is trained. After the cam disc 299 has rotated through a certain angle, it will cause the latch 306 to recede from engagement with the lug 309, thereby interrupting the rotary movement of the disc 311. The parts of the machine are so coordinated that rotation of the sprocket 257 is continued until the knife 254 has completed one cycle of operation about the sprockets 251 and 257 and then its movement is automatically stopped. Obviously, the gear ratios which are employed may be modified, whereby the sprocket 257 driving the chain 253 will be actuated at any desired interval. Accordingly, the knife 254 may be rendered operative after two, three or any other desired number of feed strokes of the pitman rod 77.

In operating my machine, the fabric 130 is supplied thereto from a device such, for example, as that described in my co-pending application, Serial No. 200,493, filed June 21, 1927, and assigned to The Goodyear Tire & Rubber Company. The fabric 130 is properly positioned by drawing it between the feed rollers 114 and the caster members 124. The casters, as has been already stated, may be disposed at a slight angle to the axes of the rollers to remove any wrinkles in the fabric. Frictional engagement between the feed rollers and fabric is insured by the idler rollers 132, under which the stock is conducted. In properly positioning the fabric upon the machine preparatory to the cutting operation the idler rollers 132 are raised by rotating the hand wheel 141 in the proper direction to actuate the tapped block 134 upwardly. After the fabric stock is conducted beneath the idler rollers, the latter are again lowered by rotating the wheel 141 in the reverse direction. After passing beneath the idler rollers, the fabric material is conducted to the conveyor belts 226.

After engaging the belts, the fabric is conveyed thereby in a horizontal plane until it extends beyond the cutter bar 147.

The cutter bar is positioned at the desired angle with respect to the fabric by unscrewing the bolt 265 which clamps the diagonal plate 23 between the L-shaped member 264 and the lever 259. Subsequently, the hand wheel 263 is rotated in an appropriate direction whereby the cutting mechanism is revolved through the desired angle about its axis of revolution. The desired position is then maintained by tightening the bolt 265.

Figures 19, 20, 21:
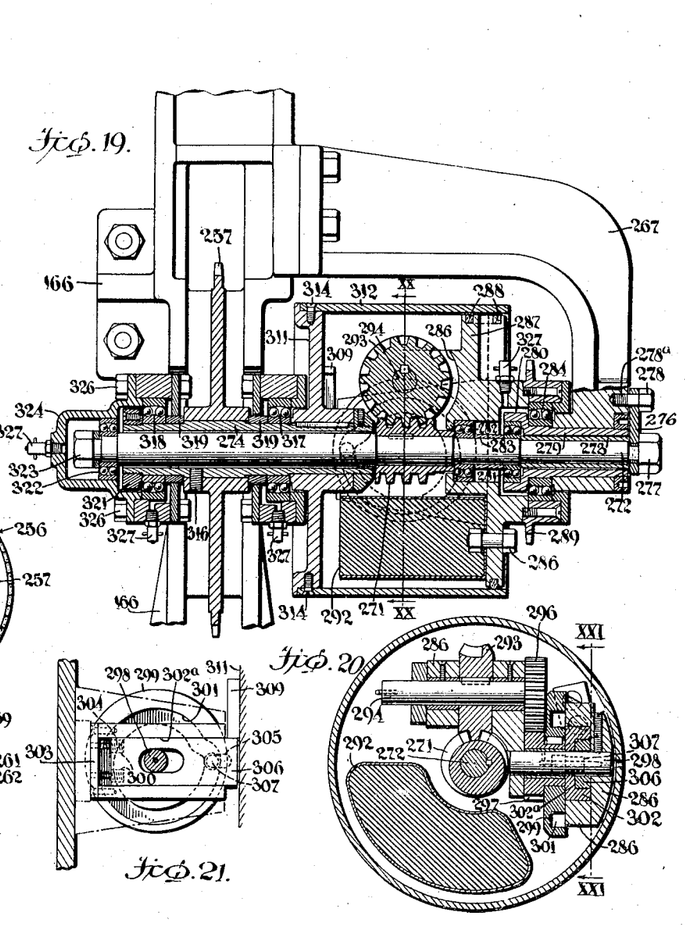
Fig. 19 is a fragmentary cross-sectional view of an automatic intermittently operated drive mechanism for actuating the cutter chain of the bias cutter, the view being taken substantially along the line XIX—XIX of Fig. 18.
Fig. 20 is a cross-sectional view of the drive mechanism shown by Fig. 19 taken substantially along the line XX—XX thereof.
Fig. 21 is a cross-sectional view of a cam mechanism contained in the drive mechanism and taken substantially along the line XXI—XXI of Fig. 20.

If it is desired to cut a strip of fabric after each feed stroke of the cutting mechanism, fluid communication is established between the inlet valve operated by the cam 205 which is so timed as to respond after each fabric feed stroke of the pitman rod 77. At the same time, fluid communication through the valve operated by cam 203 is terminated. The set screw 278, illustrated in Fig. 19, is then removed in order that the shaft 272 may idle, and the continuous rotary movement of the sprocket 289 may be transmitted to the sprocket 257. Strips of fabric of different widths may be cut by setting the cross head 76 at proper distances from the center of the axis of rotation of the crank disc 72. The necessary adjustment is performed by rotating the screw shaft 74 in an appropriate direction.

A description of the movement of the elements during each cutting cycle follows: The main shaft 32 of the machine is rotated continuously by the motor 27 through the clutch mechanism 38. The intermittently operated feeding mechanism is driven by the chain 61 from the sprocket 34, which is keyed to the main shaft. The gear 89, which is rotated in a clockwise and counter-clockwise direction by the gear segment 81 with which it meshes, actuates the ratchet disc 91 forming a part of the one-way clutch mechanism. When the disc 91 is rotated in a clockwise direction, as viewed in Fig. 8, each cylindrical roller 96 is moved toward the apex of the triangular slot 92 and securely engages the flanged portion of the stepped drum 102, thereby actuating the drum unitarily with the disc 91. When the disc is rotated in the reverse direction, the drum remains stationary. The ring gear 103 which is integral with the drum meshes with and drives the worm gear 104 which rotates the feed roller drive shaft 106 during each feed stroke of the pitman 77.

During the period when the intermittently operated feeding mechanism is being actuated, the clamping bar 181 is in a raised position to permit the fabric to pass between the clamping bar and the cutter bar 147. At the instant that the feed stroke is completed, the clamping bar is lowered to engage the fabric. This movement is effected by properly timing the valve mechanism 188 which admits fluid to and discharges it from the piston cylinders 163, by which the clamping bar 181 is actuated. These valve mechanisms are in communication with the cylinders 163 through suitable conduits (not shown).

To clamp the bar 181 fluid is admitted to the head of the cylinders 163, thereby actuating the piston 184 downwardly and compressing the spring 186. At the same time, the bar 181 actuates the dash pot piston 169 which retards the downward movement of the bar and absorbs any shock which would be caused by a sudden contact with the fabric on the cutter bar 147. As soon as the fabric is clamped, the knife 254 which is actuated continuously by the chain 253 engages and cuts the fabric as it travels through the channel 252 provided therefor in the cutter and clamping bars. The machine is so synchronized that by the time the knife has passed about the sprocket 251 and back to the sprocket 257 preparatory for another cutting stroke, the clamping bar 147 will have been raised, another width of fabric supplied thereto, and the bar lowered again, thereby clamping the fabric securely in readiness for the next cutting operation.

By the time the knife has reached the end of its cutting stroke, the inlet valve 205 will have been closed and the exhaust valve 204 is open in order that the fluid at the head of the piston 184 may be discharged. The compressed spring 186 will then raise the piston 184, carrying with it the clamping bar 181. At this instant, the oscillating gear segment 81 will have reversed its direction of travel and will actuate the one-way clutch disc 91 in a clockwise direction, whereby the feeding mechanism 26 will be rendered operative.

In order that the feeding mechanism may be actuated more than once before each cutting stroke of the knife, the link 276, illustrated in Fig. 19, is secured to the L-shaped arm by the set screw 278. A gate valve, not shown, through which compressed air is conducted to the valve operated by cam 203, illustrated in Fig. 13, is opened, and a similar gate valve (not shown) which supplies pressure fluid to the inlet valve operated by cam 205 is closed. The valve adjustment causes the clamping bar 181 to be lowered in synchronized relation with the cutting member; that is, if the cutting knife 254 is rendered operative after every other feed stroke, by means of properly selected gears, the valve mechanism operating the clamping bar will likewise so be actuated. In other respects the machine is operated in a manner that is analogous to that when its cutting operation follows each feed stroke of the pitman rod 77.

Although I have illustrated but one form which my invention may assume and described in detail a single application thereof, it will be apparent to those skilled in the art that it is not so limited, but that various minor modifications and changes may be made therein without departing from the spirit of my invention, or from the scope of the appended claims.

What I claim is:

1. A machine for cutting fabric comprising means periodically operated for supplying the fabric in a horizontal plane, means for clamping the fabric securely during the quiescent intervals of the supplying means, a cutting element, and means for moving the element transversely of the fabric in cutting engagement therewith and in a direction acute to the plane thereof while the fabric is held by the clamping means.

2. A machine for cutting fabric comprising means periodically operated for supplying the fabric, means for clamping the fabric securely during the quiescent intervals of the supplying means, a continuously driven chain disposed adjacent the clamping means, and a knife secured to the chain and actuated thereby to cut the fabric while it is held by the clamping means, the chain and knife being so disposed that different portions of the knife successively engage the fabric.

3. A machine for cutting fabric comprising means periodically operated for supplying the fabric, a clamping bar mechanism for holding the fabric securely during the quiescent intervals of the periodically operated supplying means, a cutting element, and means for moving the element transversely of the fabric in cutting engagement therewith and in inclined relation to the plane of the fabric, while the latter is held by the clamping bar.

4. The combination with a machine for cutting fabric, comprising means periodically operated for supplying the fabric thereto, intermittently operated clamping means for engaging the fabric during the quiescent intervals of the supplying means, and continuously actuated means for cutting the fabric while it is held by the clamping means, of a dash pot device operatively joined to the clamping bar being adapted to cushion the clamping means in one direction of its movement.

5. The combination with a machine for cutting fabric, comprising means periodically operated for supplying the fabric thereto, intermittently operated clamping means for engaging the fabric during the quiescent intervals of the supplying means, and means for cutting the fabric while it is held by the clamping means, of a dash pot device adapted to cushion the clamping means in one direction of its movement, said device including a cylinder provided with a restricted vent, a piston disposed within the cylinder, resilient means for normally urging the piston in one direction, and actuating means secured to the clamping means and to the piston adapted to move the clamping means downwardly.

6. The combination with a machine for cutting fabric comprising means periodically operated for supplying the fabric thereto, a pneumatically operated clamping bar operatively associated with the fabric supplying means for securing the fabric during the quiescent intervals of the supplying means, and a knife adapted to cut the fabric while it is secured by the clamping means, of a cam operated valve mechanism operatively associated with the supplying means adapted to admit air to and to exhaust air from the clamping bar operating means at predetermined intervals.

7. The combination with a machine for cutting fabric comprising periodically operated means for supplying the fabric thereto, a pneumatically operated clamping bar operatively associated with the fabric supplying means for securing the fabric during the quiescent intervals of the supplying means, and a knife adapted to cut the fabric while it is secured by the clamping means, of a cam operated valve mechanism operatively associated with the clamping means being adapted to control the pneumatic operation of the clamping means.

8. The combination with a machine for cutting fabric having intermittently operated means for clamping the fabric securely and means for cutting the fabric while it is clamped, of means for supplying the fabric intermittently, comprising a plurality of driven rollers adapted to convey the fabric, means cooperatively associated with the clamping means for rotating the rollers intermittently, a plurality of additional rollers disposed adjacent the ends of the driven rollers adapted to engage the fabric conveyed by the latter.

9. The combination with a machine for cutting fabric having intermittently operated means for clamping the fabric securely and means for cutting the fabric while it is clamped, of means for supplying the fabric intermittently, comprising a plurality of driven rollers adapted to convey the fabric, means cooperatively associated with the clamping means for rotating the rollers intermittently, a plurality of additional rollers for engaging the fabric disposed adjacent the ends of the driven rollers, the additional rollers having their axes parallel to the plane of the fabric and at a slight angle to the axes of driven rolls.

10. A machine for cutting fabric into strips comprising means for feeding the fabric intermittently through the machine and means for cutting the fabric including a clamping bar having its ends revolvably adjustable about its central axis, and adapted to engage the fabric securely during the quiescent intervals of the feeding means, a knife actuated by the machine for cutting the fabric while it is secured by the clamping bar, and a mechanism driven by the machine for moving the knife along an endless path including power transmitting means coaxial with the revolvable clamping bar, and operatively associated with the feeding means.

11. A machine for cutting fabric into strips, comprising means for feeding the fabric intermittently through the machine and means for cutting the fabric including a clamping bar having its end portions revolvably adjustable about its central axis in a plane parallel to the plane of the fabric and adapted to engage the fabric securely during the quiescent intervals of the feeding means, an endless chain having a knife secured thereto for cutting the fabric while it is clamped, and a means for driving the chain in synchronized relation with the feeding means.

12. A machine for cutting fabric into strips, comprising means for feeding the fabric intermittently through the machine and means for manipulating the fabric including a clamping bar revolvably adjustable about its central axis in a plane parallel to the plane of the fabric and adapted to engage the fabric securely during the quiescent intervals of the feeding means, a chain having a knife secured thereto for cutting the fabric while it is clamped, said chain being supported by the revolvable bar, and a mechanism for imparting unidirectional movement to the chain in synchronized relation with the fabric feeding means.

13. The combination with a machine for cutting fabric, comprising means for feeding the fabric intermittently thereto, an angularly adjustable clamping bar for securing the fabric during the quiescent intervals of the feeding mechanism, and means for cutting the fabric while it is held by the clamping bar, of a belt conveyor for conducting the fabric through the machine and a movable pulley mechanism in operative relation with the adjustable clamping bar, adapted to maintain a substantially constant spaced relationship therewith.

14. The combination with a machine for cutting fabric comprising means for feeding the fabric intermittently thereto, an angularly adjustable clamping bar for securing the fabric during the quiescent intervals of the feeding means, and means for cutting the fabric while it is held by the clamping bar, of a belt conveyor for conducting the fabric through the machine, and a pulley mechanism adapted to conduct the belt about the revolvably adjustable clamping bar and actuatable by the clamping bar in a direction parallel to the belt.

15. The combination with a machine for cutting fabric, comprising means for feeding the fabric intermittently thereto, an angularly adjustable clamping bar for securing the fabric during the quiescent intervals of
the feeding means, means for cutting the fabric while it is held by the clamping bar, and
a belt conveyor for transporting the fabric
through the machine, of a pulley device for
conducting the belt conveyor about the cutter bar, comprising a frame member adapted to be actuated by the revolvable bar in a
direction parallel to the direction of travel
of the belt, and rollers mounted in the frame
adapted to guide the belt about the bar.

In witness whereof, I have hereunto signed
my name.

ELOV F. MAAS.